United States Patent [19]

Buis et al.

[11] Patent Number: 5,162,150
[45] Date of Patent: Nov. 10, 1992

[54] DUCT TAPE

[75] Inventors: Charles D. Buis, Greenville; Kenneth H. Sanders, Jonesville, both of S.C.

[73] Assignee: Milliken Research Corporation, Spartanburg, S.C.

[21] Appl. No.: 747,522

[22] Filed: Aug. 20, 1991

[51] Int. Cl.[5] .................... B32B 7/12; B32B 15/04
[52] U.S. Cl. .................... 428/343; 428/247; 428/251; 428/252; 428/255; 428/261; 428/295; 428/354; 428/110
[58] Field of Search ............... 428/247, 251, 252, 255, 428/261, 295, 343, 354

[56] References Cited

U.S. PATENT DOCUMENTS

| | | | |
|---|---|---|---|
| 2,851,389 | 9/1958 | Lappala | 428/295 |
| 3,444,024 | 12/1965 | Hillas | 428/295 |
| 3,846,205 | 11/1974 | Yazawa | 428/295 |
| 4,304,813 | 12/1981 | Elmore, Jr. | 428/354 |
| 4,454,192 | 6/1984 | Suzuke | 428/295 |
| 4,584,227 | 4/1986 | Dayie et al. | 428/295 |
| 4,636,427 | 1/1987 | Ohno et al. | 428/354 |
| 4,740,416 | 4/1988 | De Coste, Jr. et al. | 428/354 |
| 4,751,269 | 6/1988 | Bonk et al. | 428/355 |
| 4,770,490 | 9/1988 | Gruenewald et al. | 428/295 |

Primary Examiner—Jenna L. Davis
Assistant Examiner—Kathryne E. Shelborne
Attorney, Agent, or Firm—Earle R. Marden; H. William Petry

[57] ABSTRACT

A pressure sensitive tape composed of a polyethylene base film; a continuous filament scrim fabric having a fiberglass fill yarn and a pressure sensitive adhesive applied to the film through the substrate.

7 Claims, 1 Drawing Sheet

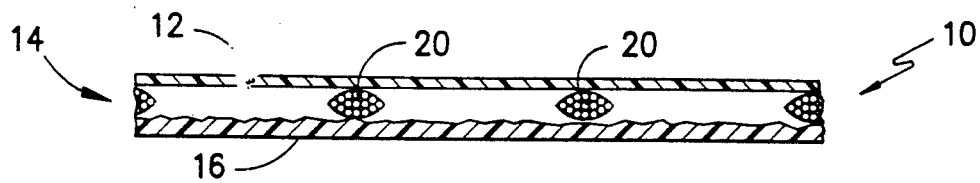
FIG. -1-
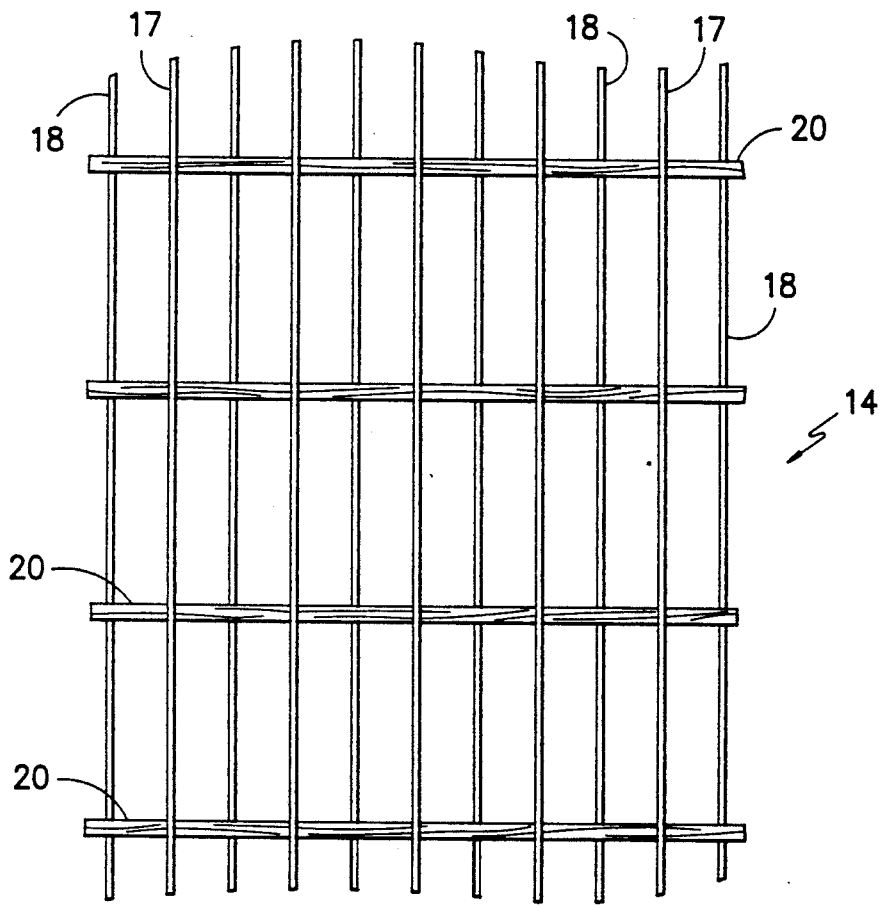
FIG. -2-
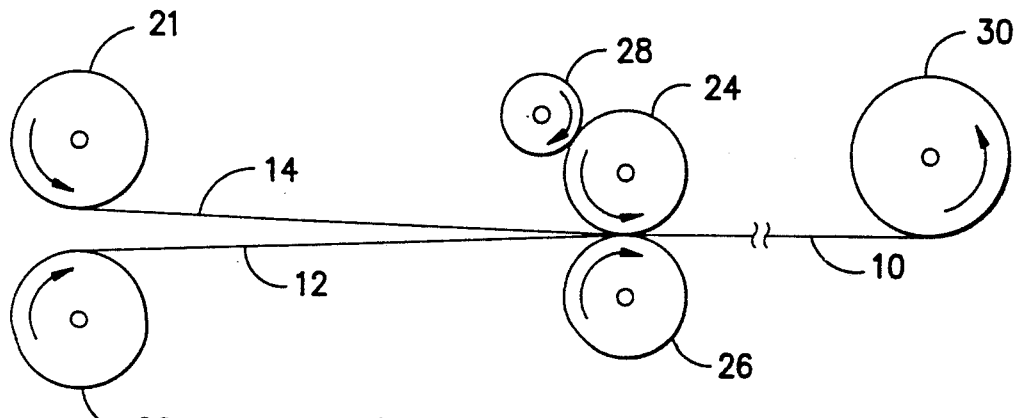
FIG. -3-

DUCT TAPE

Pressure sensitive tapes are well known in the commercial world but have had disadvantages due to strength, cost and tearability in use. Most such tapes have employed woven fabrics as the carrier fabric placed between the backing material and the pressure sensitive adhesive.

It is, therefore, an object of the invention to provide a pressure sensitive tape which is economical to produce, is light weight, can readily be separated from the roll of tape and has an even coat of pressure sensitive adhesive on the adhesive side of the fabric.

Other objects and advantages of the invention will become readily apparent as the specification proceeds to describe the invention, with reference to the accompanying drawings, in which:

FIG. 1 is a cross-sectional, schematic view of the new and improved pressure sensitive tape;

FIG. 2 is a top or loop side view of the carrier fabric used in the tape of FIG. 1, and FIG. 3 is a schematic view of the method of fabricating the tape of FIG. 1.

As is well known in the trade, the pressure sensitive tape 10 will be manufactured in wide widths and then cut to the desired width for the desired use. As shown in FIG. 1 the tape 10 consists of a base layer of a three millimeter polyethylene film 12, a carrier layer of a scrim fabric 14 and a layer of a pressure sensitive adhesive 16.

The carrier fabric 14 illustrated in FIG. 2 is an open mesh nonwoven scrim fabric having upper and lower 70 denier, polyester multifilament warp yarns 17 and 18, respectively, and 50 denier multifilament fiberglass fill or weft yarns 20 substantially perpendicular thereto forming square or rectangular openings formed in a manner generally disclosed in U. S. Pat. No. 3,608,164. After formation the scrim film 14 is passed through an acrylic adhesive bath and over heated drying rolls to secure the yarns together. The scrim fabric 14 can have 10–35 (preferably 20) warp ends/inch and 2–6 (preferably 4) weft yarns/inch. In the preferred form of the invention the warp yarns 17, 18 are 70 denier but can be in the range of 40–150 denier while the weft yarns preferably are 50 denier but can be in the range of 25 to 200 denier.

The fabric from which the tape 10 is slit is produced in the manner shown in FIG. 3. As shown in FIG. 3, the carrier fabric 14 is supplied from a supply roll 21 and mates with the polyethylene film 12 from the supply roll 22 at the nip of the calender rolls 24 and 26. Calender roll 24 is supplied, by kiss roll 28, a rubber gum pressure sensitive adhesive which is pressed into and through the fabric 14 to laminate the fabric 14 to the base film 12 to provide the pressure sensitive tape 10 when allowed to set after passing through the nip of calender rolls 24 and 26. The completed tape is then taken up on take-up roll 30. The rubber gum adhesive is any of the so-called commercially available pressure sensitive adhesives.

The resultant tape made from the above method provides a tape that is light-weight and, because of the open construction of the carrier fabric 14, provides a tape on which the adhesive is more evenly distributed. Furthermore, as compared to prior art tapes, the scrim carrier fabric allows more even distribution of the pressure sensitive adhesive with the application of less adhesive. Also, the resultant fabric is of lighter gauge and can be readily torn from the roll. Furthermore the fiberglass weft yarns tend to have very little distortion or shrinkage upon the application of heat allowing the number of weft yarns to be reduced and still retain structure integrity thereby reducing the cost of production of the scrim fabric as well as the resultant pressure sensitive tape. A further advantage of the use of fiberglass yarn is that the scrim fabric is more resistant to damage by fire or extreme hot conditions.

We claim:

1. A pressure sensitive tape comprising: a layer of plastic film, a layer of non-woven open mesh scrim fabric laminated to said film and a pressure sensitive adhesive adjacent to said fabric and connected to said fabric and said film, said nonwoven fabric having warp yarns extending in the longitudinal direction and weft yarns extending perpendicularly across and uninterlocked to said warp yarns, said weft yarns being fiberglass continuous filament yarns and connected to said warp yarns.

2. The tape of claim 1 wherein said warp yarns are polyester.

3. The tape of claim 2 wherein said film is polyethylene.

4. The tape of claim 2 wherein the number of warp yarns is in the range of 10–25 per inch and the number of weft yarns is in the range of 2–6 per inch.

5. The tape of claim 4 wherein the number of warp yarns is 20 per inch.

6. The tape of claim 4 wherein the number of weft yarns is 4 per inch.

7. The tape of claim 6 wherein the number of warp yarns is 20 per inch.

* * * * *